United States Patent
Stoica et al.

(10) Patent No.: US 11,126,360 B2
(45) Date of Patent: Sep. 21, 2021

(54) DYNAMICALLY ADJUSTING BLOCK MODE POOL SIZES

(71) Applicant: International Business Machines Corporation, Armonk, NY (US)

(72) Inventors: Radu Ioan Stoica, Zurich (CH);
Roman Alexander Pletka, Uster (CH);
Nikolas Ioannou, Zurich (CH);
Nikolaos Papandreou, Thalwil (CH);
Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 16/660,627

(22) Filed: Oct. 22, 2019

(65) Prior Publication Data
US 2021/0117118 A1 Apr. 22, 2021

(51) Int. Cl.
*G06F 12/00* (2006.01)
*G06F 3/06* (2006.01)

(52) U.S. Cl.
CPC .......... *G06F 3/0644* (2013.01); *G06F 3/0604* (2013.01); *G06F 3/0631* (2013.01); *G06F 3/0647* (2013.01); *G06F 3/0679* (2013.01)

(58) Field of Classification Search
CPC .... G06F 3/0644; G06F 3/0604; G06F 3/0631; G06F 3/0647; G06F 3/0679
See application file for complete search history.

(56) References Cited

U.S. PATENT DOCUMENTS

| | | | |
|---|---|---|---|
| 6,282,613 B1 | 8/2001 | Hsu et al. | |
| 7,493,419 B2* | 2/2009 | Moilanen | G06F 9/5083 370/230 |
| 7,788,449 B2 | 8/2010 | Kam et al. | |
| 7,948,798 B1 | 5/2011 | Sheredy et al. | |
| 8,407,400 B2 | 3/2013 | Marotta et al. | |
| 8,667,215 B2* | 3/2014 | Marotta | G11C 16/16 711/103 |
| 10,789,003 B1* | 9/2020 | Sun | G06F 12/0238 |
| 10,853,148 B1* | 12/2020 | Kenney | G06F 9/4881 |

(Continued)

OTHER PUBLICATIONS

Yao et al., "TLC-FTL: Workload-aware Flash Translation Layer for TLC/SLC Dual-Mode Flash Memory in Embedded Systems," IEEE 17th International Conference on High Performance Computing and Communications (HPCC), 2015, pp. 831-834.

(Continued)

*Primary Examiner* — John A Lane
(74) *Attorney, Agent, or Firm* — Zilka-Kotab, P.C.

(57) ABSTRACT

A computer-implemented method, according to one embodiment, is for managing a plurality of blocks of memory in two or more pools. The computer-implemented method includes: maintaining a first subset of the plurality of blocks in a first pool, where the blocks maintained in the first pool are configured in single-level cell (SLC) mode. A second subset of the plurality of blocks is also maintained in a second pool, where the blocks maintained in the second pool are configured in multi-bit-per-cell mode. Current workload input/output (I/O) metrics are also identified during runtime. Moreover, a size of the first subset of blocks in the first pool and a size of the second subset of blocks in the second pool are adjusted based on the current workload I/O metrics.

19 Claims, 11 Drawing Sheets

(56) References Cited

U.S. PATENT DOCUMENTS

| | | | |
|---|---|---|---|
| 2009/0259799 A1* | 10/2009 | Wong | G06F 3/0679 711/103 |
| 2015/0066470 A1* | 3/2015 | Chopra | G06F 3/0605 703/20 |
| 2016/0147665 A1* | 5/2016 | Magdon-Ismail | G06F 11/3006 711/118 |
| 2017/0315931 A1* | 11/2017 | Liu | G06F 12/02 |
| 2018/0285563 A1* | 10/2018 | Browne | G06F 21/53 |
| 2019/0065080 A1 | 2/2019 | Tanpairoj et al. | |
| 2019/0258544 A1* | 8/2019 | Hoei | G06F 11/1076 |
| 2019/0258584 A1* | 8/2019 | Hale | G06F 3/0604 |
| 2019/0324799 A1* | 10/2019 | Metsch | G06F 9/4881 |
| 2019/0334801 A1* | 10/2019 | Dutta | G06F 11/3447 |
| 2020/0167089 A1* | 5/2020 | Natarajan | G06F 3/064 |
| 2020/0393971 A1* | 12/2020 | Dutta | G06F 3/0611 |
| 2020/0393981 A1* | 12/2020 | Dutta | G06F 3/0683 |
| 2020/0401514 A1* | 12/2020 | Liang | G11C 16/10 |
| 2020/0401515 A1* | 12/2020 | Liang | G11C 16/10 |
| 2021/0011642 A1* | 1/2021 | Lee | G06F 3/065 |

OTHER PUBLICATIONS

Yang et al., "Utilization-Aware Self-Tuning Design for TLC Flash Storage Devices," IEEE Transactions on Very Large Scale Integration (VLSI) Systems, vol. 24, No. 10, Oct. 2016, pp. 3132-3144.

Liu et al., "A workload-aware flash translation layer enhancing performance and lifespan of TLC/SLC dual-mode flash memory in embedded systems," Microprocessors and Microsystems, vol. 52, 2017, pp. 343-354.

* cited by examiner

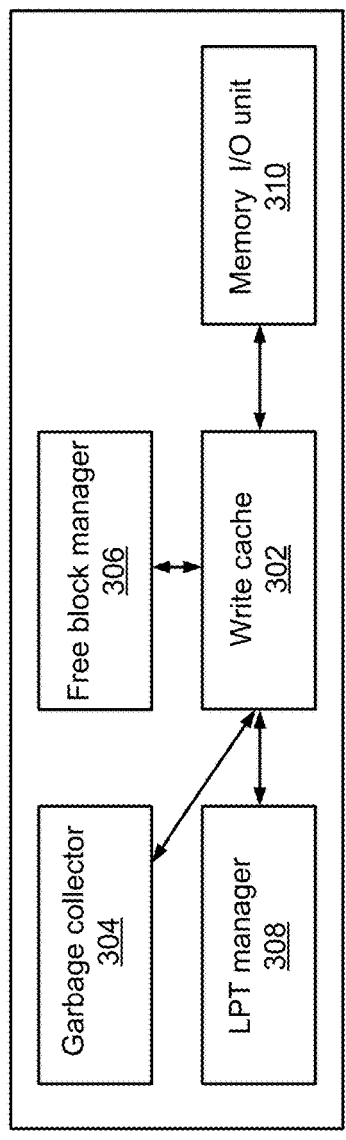
FIG. 3
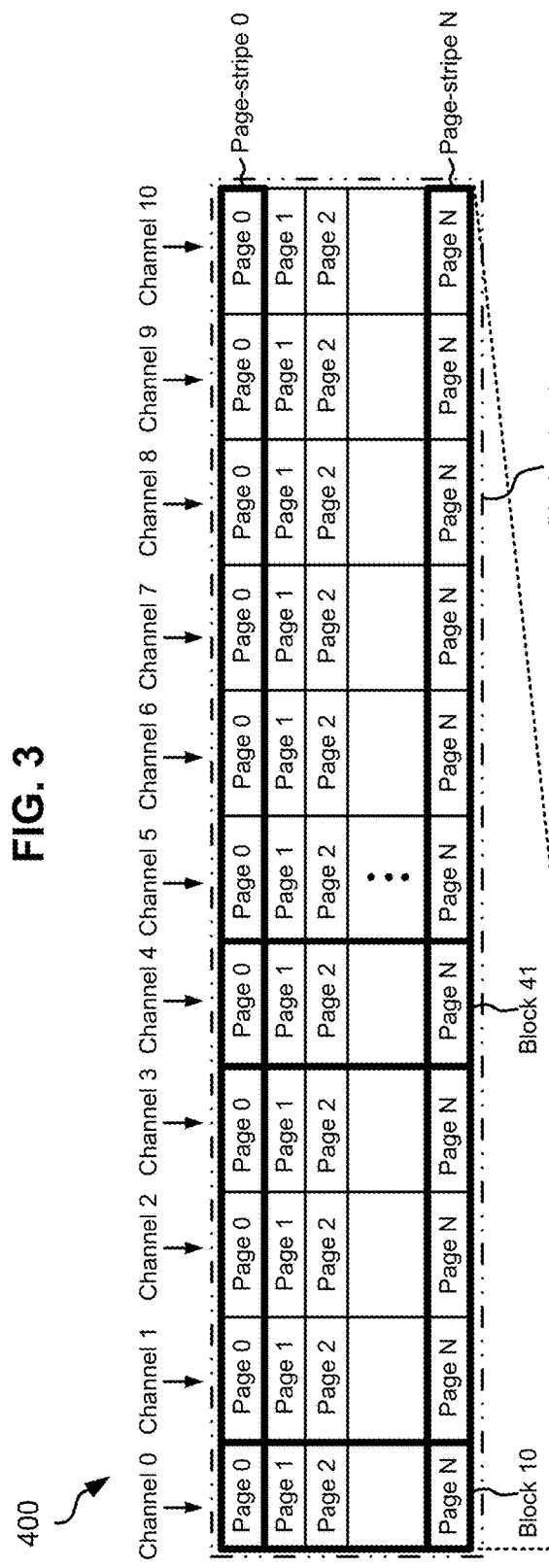
FIG. 4
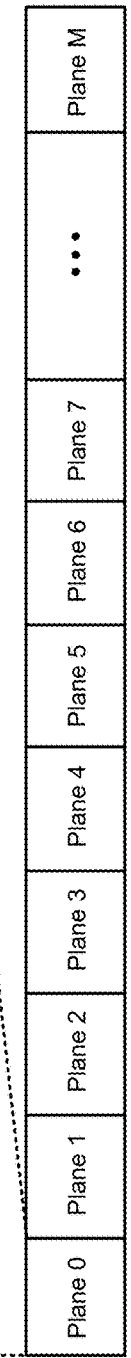

DYNAMICALLY ADJUSTING BLOCK MODE POOL SIZES

BACKGROUND

The present invention relates to data storage systems, and more particularly, this invention relates to dynamically adjusting block mode pool sizes.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH, LDPC, or other codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The physical configurations of memory blocks in non-volatile memory have also changed over time. For instance, in the past Flash blocks had a single-bit-per-cell configuration, but improvements in data storage have introduced Flash blocks that implement multi-bit-per-cell configurations. Some Flash blocks also support more than one different physical configuration, e.g., based on their given mode. Moreover, hybrid controllers are capable of managing and/or adapting these blocks which are configured in single-bit-per-cell mode as well as multi-bit-per-cell mode.

SUMMARY

A computer-implemented method, according to one embodiment, is for managing a plurality of blocks of memory in two or more pools. The computer-implemented method includes: maintaining a first subset of the plurality of blocks in a first pool, where the blocks maintained in the first pool are configured in single-level cell (SLC) mode. A second subset of the plurality of blocks is also maintained in a second pool, where the blocks maintained in the second pool are configured in multi-bit-per-cell mode. Current workload input/output (I/O) metrics are also identified during runtime. Moreover, a size of the first subset of blocks in the first pool and a size of the second subset of blocks in the second pool are adjusted based on the current workload I/O metrics.

A computer program product, according to another embodiment, is for managing a plurality of blocks of memory in two or more pools. The computer program product includes a computer readable storage medium having program instructions embodied therewith. Moreover, the program instructions are readable and/or executable by a processor to cause the processor to: perform the foregoing method.

A system, according to yet another embodiment, includes: a plurality of non-volatile random access memory (NVRAM) blocks configured to store data. The system also includes a processor and logic integrated with and/or executable by the processor. The logic is configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
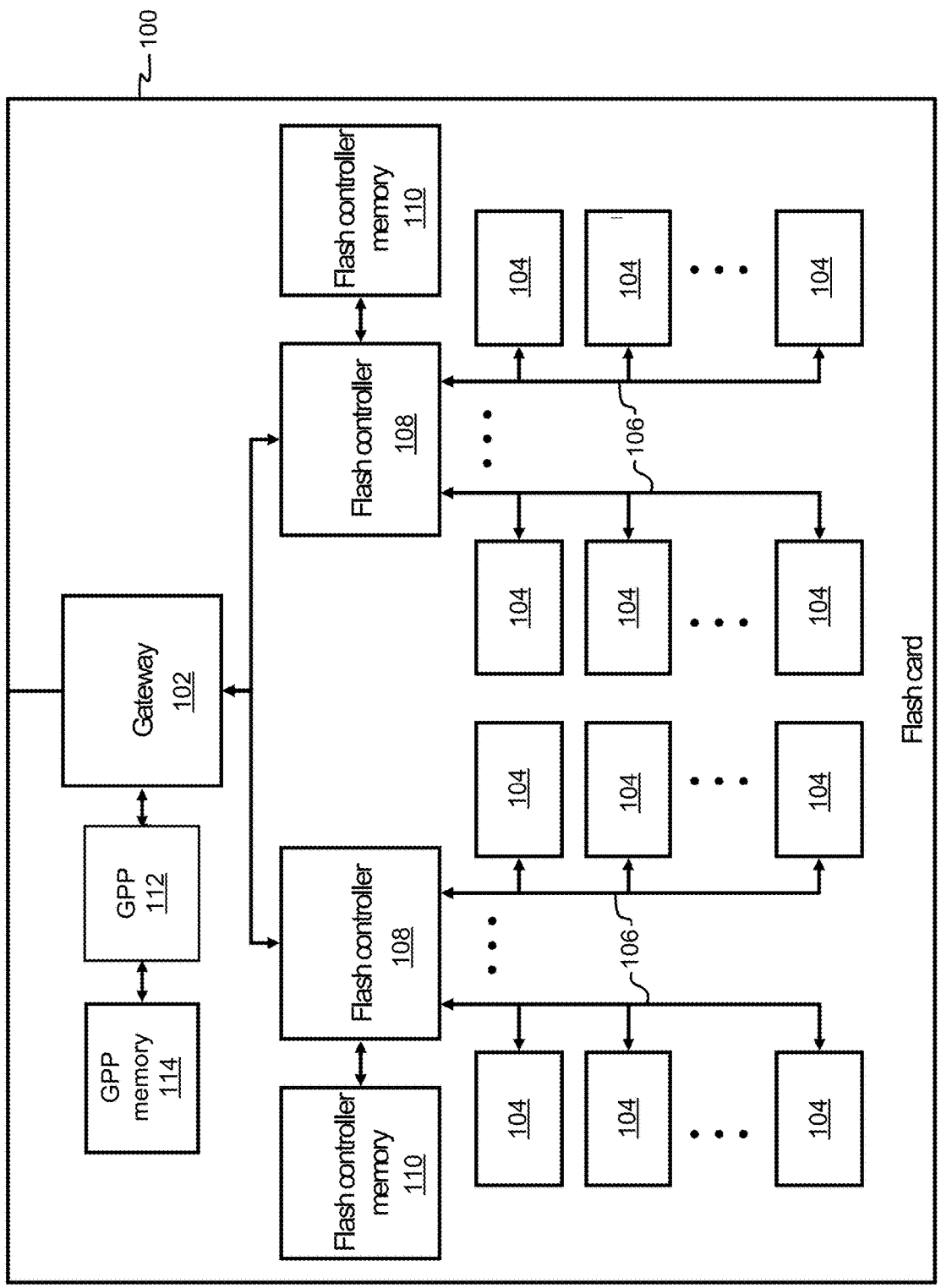
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method is for managing a plurality of blocks of memory in two or more pools. The computer-implemented method includes: maintaining a first subset of the plurality of blocks in a first pool, where the blocks maintained in the first pool are configured in single-level cell (SLC) mode. A second subset of the plurality of blocks is also maintained in a second pool, where the blocks maintained in the second pool are configured in multi-bit-per-cell mode. Current workload input/output (I/O) metrics are also identified during runtime. Moreover, a size of the first subset of blocks in the first pool and a size of the second subset of blocks in the second pool are adjusted based on the current workload I/O metrics.

In another general embodiment, a computer program product is for managing a plurality of blocks of memory in two or more pools. The computer program product includes a computer readable storage medium having program instructions embodied therewith. Moreover, the program instructions are readable and/or executable by a processor to cause the processor to: perform the foregoing method.

In yet another general embodiment, a system includes: a plurality of non-volatile random access memory (NVRAM) blocks configured to store data. The system also includes a processor and logic integrated with and/or executable by the processor. The logic is configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
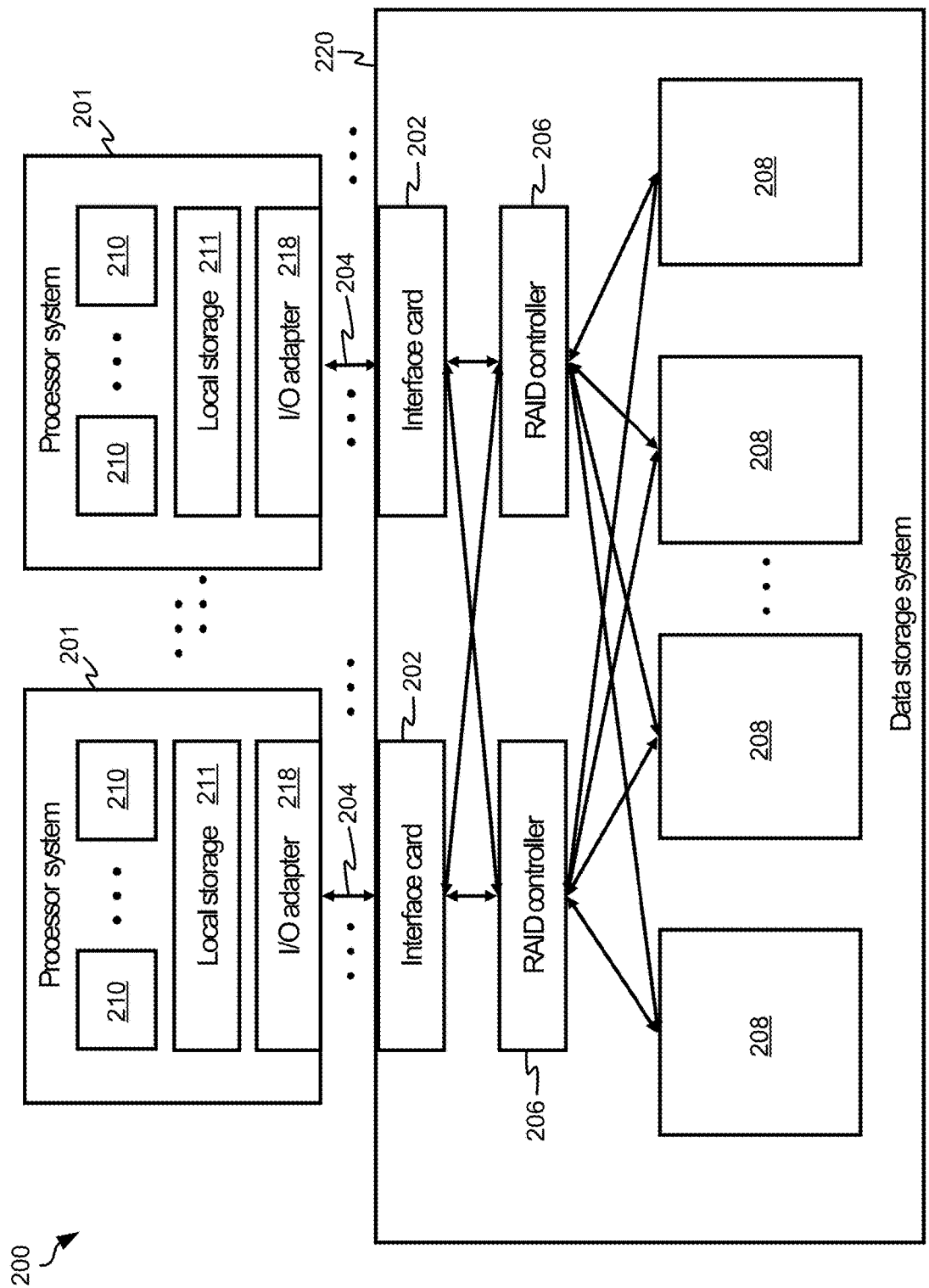
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 914 of FIG. 9, ROM 916 of FIG. 9, etc.), and an I/O adapter 218 configured to communicate with the data storage system 220.

Referring again to FIG. 1, memory controllers 108, GPP 112 and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logical erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 and/or GPP 112 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing write heat separation.

Write Heat Separation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for write heat separation when determining the write heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, write heat separation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of write heat separation is two-fold. First, performing a garbage collection process on a hot memory block will prevent triggering the relocation of cold data as well. In the absence of write heat separation, updates to hot data, which are performed frequently, also results in the undesirable relocations of all cold data collocated on the same LEB as the hot data being relocated. Therefore, the write amplification incurred by performing garbage collection is much lower for embodiments implementing write heat separation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat separation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened by associating one or more erased blocks to the LEB.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4 KiB or 16 KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As alluded to above, physical configurations of memory blocks in non-volatile memory have changed over time. For instance, in the past Flash blocks had a single-bit-per-cell configuration, but improvements in data storage have introduced Flash blocks that implement multi-bit-per-cell configurations. While blocks having multi-bit-per-cell configurations are able to store more information than blocks having a single-bit-per-cell configuration, this increase in storage capacity comes at a price in terms of reduced I/O throughput, increased I/O latency, and reduced endurance of the storage medium. For example, memory blocks having a single-bit-per-cell configuration experience write latencies that are up to 10 times lower than experienced by memory blocks having multi-bit-per-cell configurations. Similarly, memory blocks having a single-bit-per-cell configuration experience lower read latencies than memory blocks having multi-bit-per-cell configurations.

This tradeoff between storage capacity versus performance and endurance allows for storage systems to tailor the performance capabilities of memory to some extent. For instance, a storage system predicted to have a high amount of I/O traffic or program/erase (P/E) cycles is able to selectively reconfigure a greater number of memory blocks having a single-bit-per-cell configuration than those having multi-bit-per-cell configurations. Conversely, a storage system predicted to store a large amount of cold data is able to selectively reconfigure a greater number of memory blocks having multi-bit-per-cell configurations than those having a single-bit-per-cell configuration.

For instance, in some approaches block pool sizes can be adapted according to current overall device utilization information, e.g., such as the percentage of physical data storage capacity which is being used to store valid data, which can vary considerably during the lifetime of a given device. Factors such as logical data size, data compressibility, deduplication ratio, etc., also affect the device utilization. However, in addition to accounting for device utilization, various ones of the approaches included herein also desirably adapt the block pool sizes to characteristics of the I/O workloads that are actually experienced. For example, actual I/O workloads may be skewed such that a relatively small amount of the data stored in memory is updated much more frequently than a remainder of the data stored in memory.

Accordingly, various ones of the embodiments included herein implement hybrid controllers which are able to dynamically adjust the different block pool sizes based on various information. Depending on the approach, this various information includes device utilization in addition to skew of write workloads, i.e., the frequency with which data blocks are being written. Moreover, some embodiments also adjust the occupancy of the different block pools based on the given workload as well as the write skew. This various information allows for some of the embodiments that are included herein to identify the type of I/O workload(s) that is/are being experienced during runtime based on a set of predetermined "fingerprints" that have been formed for the given system.

These fingerprints further allow for the size and/or occupancy of the different block pools to be changed in real time based on a set of precomputed workload configuration templates, thereby obviating the computational inefficiencies involved with computing the desired changes to the block pools on the fly. Thoroughly identifying the type of I/O workloads that are being experienced during runtime or computing the optimal pool sizes consumes a significant amount of resources, and is often too computationally intensive to perform on the fly during regular I/O processing. Thus, by using offline simulations and/or modeling to determine the desired block pool sizes for a set of representative workloads, some of the embodiments included herein are able to significantly improve performance in terms of the efficiency by which resources are utilized, and data is stored/accessed, e.g., as will be described in further detail below.

Figure 5:
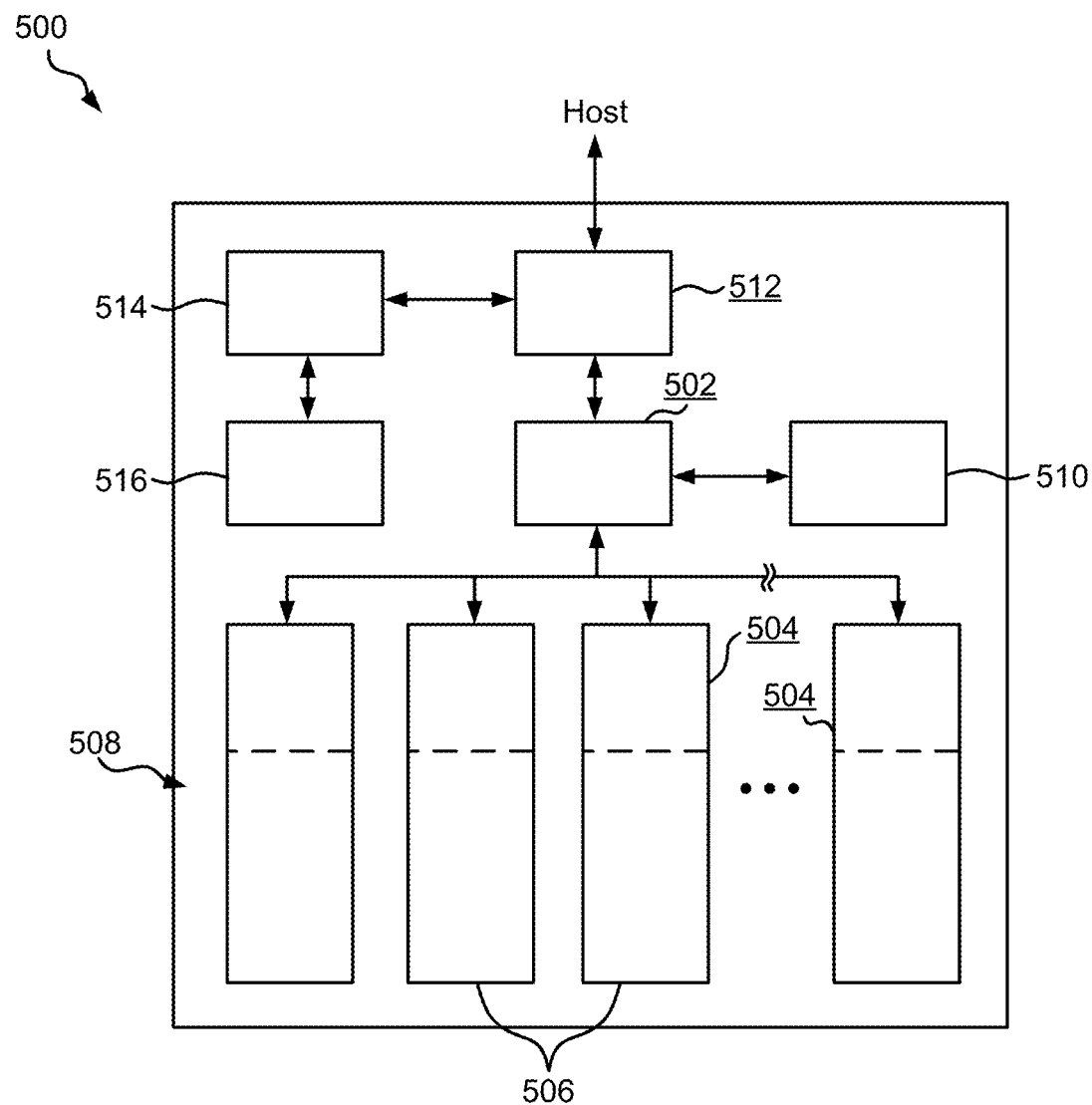
FIG. 5 is a partial representational view of a non-volatile memory module, in accordance with one embodiment.

Looking now to FIG. 5, a non-volatile memory module 500 having a hybrid controller 502 is illustrated in accordance with one embodiment. As an option, the present memory module 500 may be implemented in conjunction with features from any other embodiment listed herein, such as those described with reference to the other FIGS. However, such memory module 500 and others presented herein may be used in various applications and/or in permutations which may or may not be specifically described in the illustrative embodiments listed herein. Further, the memory module 500 presented herein may be used in any desired environment. Thus FIG. 5 (and the other FIGS.) may be deemed to include any possible permutation.

As noted above, the memory module 500 includes a hybrid controller 502 which is capable of managing and/or adapting blocks which are configured in single-bit-per-cell mode (also referred to herein as "single-level cell mode", or "SLC mode") as well as multi-bit-per-cell mode. According to some approaches, the hybrid controller 502 manages the different block configurations by logically splitting them into two different pools 504, 506. One of these pools 504 is designated as including those blocks which are configured in SLC mode, while the other pool 506 includes the blocks configured in multi-bit-per-cell mode. In some approaches, the blocks configured in multi-bit-per-cell mode are configured in triple-level cell (TLC) mode. In other approaches, the blocks configured in multi-bit-per-cell mode are configured in quad-level cell (QLC) mode. In further approaches, the blocks configured in multi-bit-per-cell mode are configured in penta-level cell (PLC) mode.

Each of the pools 504, 506 extend across a number of data storage components (e.g., NVRAM memory modules such as NAND flash memory devices) which together serve as a memory array 508. It follows that the various components illustrated in FIG. 5 function as a memory card and may implement any of the approaches described above with respect to memory card 100 of FIG. 1. Referring still to FIG. 5, the hybrid controller 502 is also coupled to a cache memory 510 as well as a gateway 512 which receives data commands from one or more hosts, storage systems, running applications, etc. The gateway 512 is in turn coupled to a GPP 514 and GPP memory 516. As mentioned above, the GPP 514 may be of any desired type, e.g., such as an ASIC, FPGA, CPU, etc. Similarly, the GPP memory 516 may be of any desired type, e.g., such as RAM, ROM, battery-backed DRAM, phase-change memory PC-RAM, MRAM, STT-MRAM, etc., and/or combinations thereof.

The hybrid controller 502 may store data that is frequently accessed (e.g., read, rewritten, appended to, etc.) in blocks that are configured in SLC mode and therefore included in the first pool 504, while data that is accessed less frequently is stored in blocks that are configured in multi-bit-per-cell mode and therefore included in the second pool 506. This storage scheme achieves an efficient use of the different blocks of memory and their respective performance characteristics. However, as memory blocks in each of the pools 504, 506 experience different amounts of wear as well as different numbers of P/E cycles over time, the effective health of each block diverges from the others. Even though wear of different blocks increases differently with increasing P/E cycles, for the same P/E cycles, the wear experienced in multi-bit-cells increases faster than that experienced in SLC cells on average. Moreover, as the ratio of hot and cold data stored in the memory module 500 fluctuates over time, each of the respective pools 504, 506 may be underutilized and/or overutilized.

Accordingly, the hybrid controller 502 is able to selectively reconfigure any of the blocks in the first and/or second pools 504, 506 to dynamically adapt the memory based on actual utilization thereof as well as workload metrics, e.g., such as skew of the write workload. More specifically, in preferred approaches, utilization and workload metrics of the memory are used to form an effective fingerprint of the workload, which may then be compared against a predetermined set of fingerprints for the given memory. Each of the fingerprints are preferably precomputed offline and pre-loaded in the controller firmware. Moreover, these precomputed fingerprints may have preferred block pool size and/or utilization information associated therewith which may be implemented in response to identifying a match between the effective fingerprint and one or more of the precomputed fingerprints, e.g., as will soon become apparent.

Figure 6A:
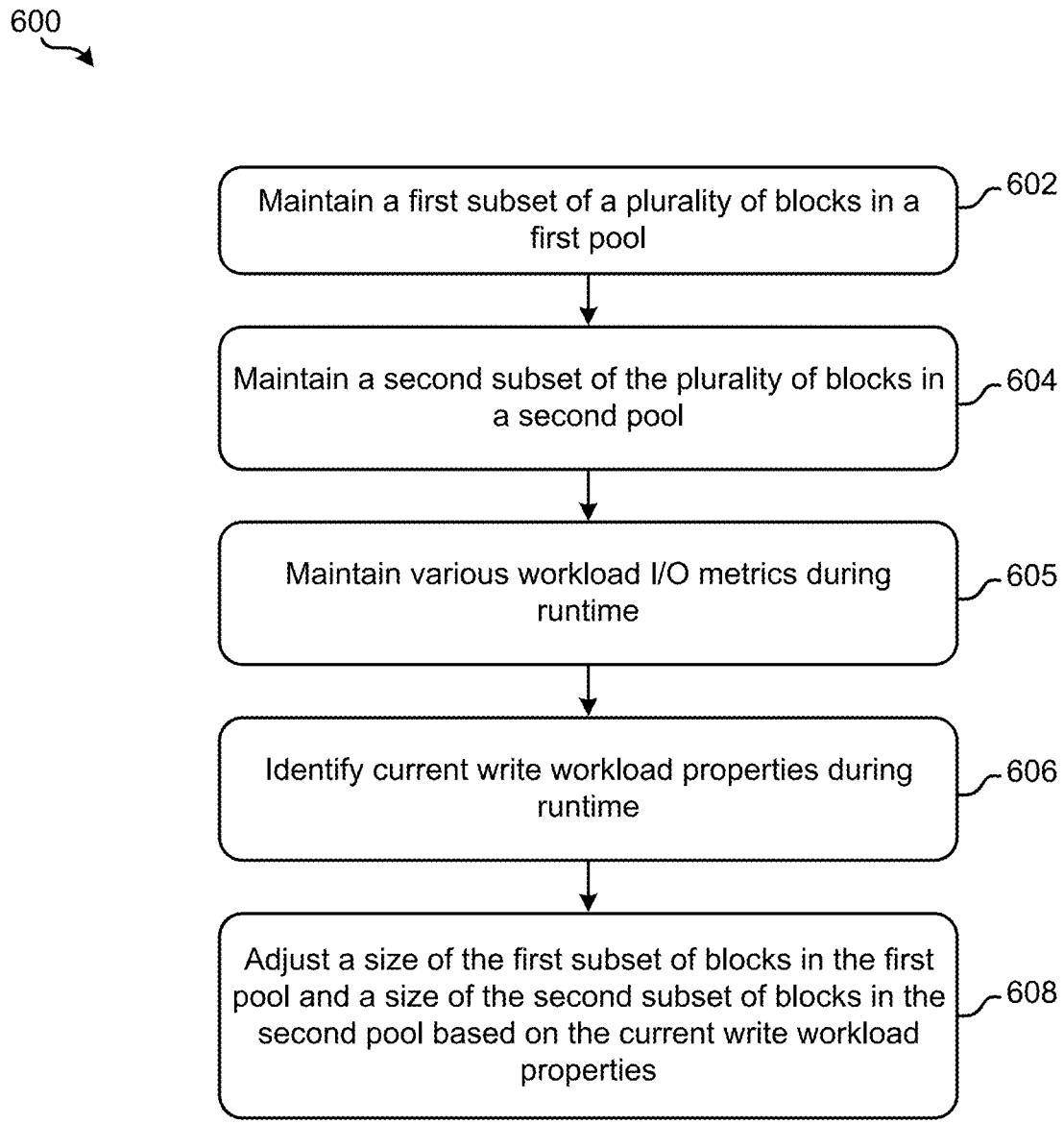
FIG. 6A is a flowchart of a method, in accordance with one embodiment.

Looking now to FIG. 6A, a method 600 for managing a plurality of blocks of memory in two or more pools in a storage system is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions. For instance, the various processes included in method 600 are described below in the context of evaluating memory blocks in a first pool which are configured in SLC mode. However, any one or more of the various processes included in method 600 may be applied in the context of evaluating memory blocks in a second pool which are configured in multi-bit-per-cell mode, e.g., as will be described in further detail below.

Each of the steps of the method 600 may be performed by any suitable component of the operating environment. For example, in various embodiments, the method 600 may be partially or entirely performed by a hybrid controller, a controller, a processor, a computer, etc., or some other device having one or more processors therein. Thus, in some embodiments, method 600 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As noted above, method 600 may be used to manage a plurality of blocks of memory in two or more pools in a storage system in accordance with one embodiment. Accordingly, operation 602 of method 600 includes maintaining a first subset of a plurality of blocks in a first pool, while operation 604 includes maintaining a second subset of the plurality of blocks in a second pool. The subsets of the plurality of blocks are preferably maintained such that the blocks in the first pool are configured in SLC mode, while the blocks in the second pool are configured in multi-bit-per-cell mode (e.g., such as TLC mode, QLC mode, etc.). Although different blocks of memory are included in different ones of the first and second pools, it should be noted that the first and second pools, or at least portions thereof, may be included in the same data storage component(s) (e.g., see 504, 506 of FIG. 5 above). It follows that the first and second pools may be physically and/or logically partitioned, e.g., as would be appreciated by one skilled in the art after reading the present description.

With continued reference to FIG. 6A, operation 605 includes maintaining various workload I/O metrics during runtime. In other words, operation 605 includes monitoring any desired number of workload I/O metrics during operation of the memory and/or overarching system. According to various approaches, which are in no way intended to limit the invention, the workload I/O metrics which may be monitored in operation 605 include, but are not limited to, write amplifications, destage frequency, invalidation rates, data sizes, etc. These workload I/O metrics may also be stored in memory (e.g., in a cache) for future use, e.g., as will soon become apparent.

Operation 606 further includes identifying current workload I/O metrics during runtime. As noted above, block pools are preferably characterized by more information than simply the write workload thereof. It follows that in preferred approaches the workload I/O metrics identified in operation 606 include write skew in addition to other types of information, e.g., such as the basic write workload, block health (e.g., as a portion of a wear leveling procedure), read and/or write heat information, etc. It should also be noted that the term "write skew" as used herein is intended to refer to a situation where logical addresses are being written with varying frequencies, e.g., as would be appreciated by one skilled in the art after reading the present description.

The current workload I/O metrics may be identified in a number of different ways depending on the given approach. For instance, in some approaches the current workload I/O metrics may be identified in real-time by sampling performance for a predetermined amount of time. In other approaches, the current workload I/O metrics may be identified using the various workload I/O metrics maintained above in operation 605. In still other approaches, the current workload I/O metrics may be identified by analyzing a group of recent performance metrics and extrapolating an accurate representation of the current properties. In still other approaches, the current workload I/O metrics may be accessed from a lookup table, or any other process that would be apparent to one skilled in the art after reading the present description.

In a preferred approach, the following metrics are maintained by the controller over a window of time or window of I/O accesses and are used to identify the current workload: the write amplifications of the single-bit and multi-bit pools; the amount, rate or frequency with which data is destaged from the single-bit to the multi-bit pool; the amount, rate or frequency with which data is invalidated in both the single-bit and multi-bit pools; the amount of data stored in both the single-bit and multi-bit pools; the size or capacity of the single-bit and multi-bit pools; etc.

Proceeding to operation 608, method 600 further includes adjusting a size of the first subset of blocks in the first pool and a size of the second subset of blocks in the second pool based on the current workload I/O metrics. In other words, operation 608 includes using the current workload I/O metrics identified in operation 606 to adjust the number of blocks included in both the first and second pools. As noted above, blocks of memory that have different physical configurations perform differently. For instance, while blocks having multi-bit-per-cell configurations are able to store more information than blocks having a single-bit-per-cell configuration, this increase in storage capacity comes at a price in terms of performance latency. Conversely, memory blocks having a single-bit-per-cell configuration experience lower read and program latencies than memory blocks having multi-bit-per-cell configurations. Block pool sizes may also be adapted according to current overall device utilization information, e.g., such as the percentage of physical data storage capacity which is being used to store valid data, which can vary considerably during the lifetime of a given device. It follows that the desired pool sizes may depend on device utilization as well as write skew, and therefore the controller is preferably able to adapt to both factors as they change over time.

By using the current I/O workload metrics experienced by the memory to determine how the size of the first and second pools (i.e., the number of blocks included in each of the first and second subsets, respectively) should be adjusted, method 600 is desirably able to correlate predetermined settings for the first and/or second block pools which are predicted to achieve desirable performance when implemented during certain types of I/O workloads. For instance, looking to FIG. 6B, exemplary sub-processes of adjusting a size of the first subset of blocks in the first pool and a size of the second subset of blocks in the second pool based on the current workload I/O metrics are illustrated in accordance with one embodiment. Accordingly, one or more of the sub-processes in FIG. 6B may be used to perform operation 608 of FIG. 6A. However, it should be noted that the sub-processes of FIG. 6B are illustrated in accordance with one embodiment which is in no way intended to limit the invention.

As shown, sub-operation 620 includes comparing the current I/O workload metrics to predetermined workload fingerprints that have been developed for the given storage system. As mentioned above, the fingerprints correspond to a specific a set of metrics and/or statistics that are experienced by the controller and may be used to identify specific operating settings (e.g., such as desirable controller parameter values) which are able to achieve desirable performance. The fingerprints thereby further allow for the size and/or occupancy of the different block pools to be changed in real time based on a set of precomputed workload configuration templates, thereby obviating the computational inefficiencies involved with computing the desired changes to the block pools on the fly.

At least some of the current I/O workload metrics which are compared against the predetermined workload fingerprints may include those metrics identified in operation 606 of method 600 above. Accordingly, sub-operation 620 of FIG. 6B may rely (to some extent) on the information gleaned as a result of performing operation 606 above. In some approaches the workload metrics identified in operation 606 may be stored in memory (at least temporarily) and made available in order to perform sub-operation 620. In other approaches, sub-operation 620 may be performed at least in part during the process of executing operation 606.

Figure 6B:
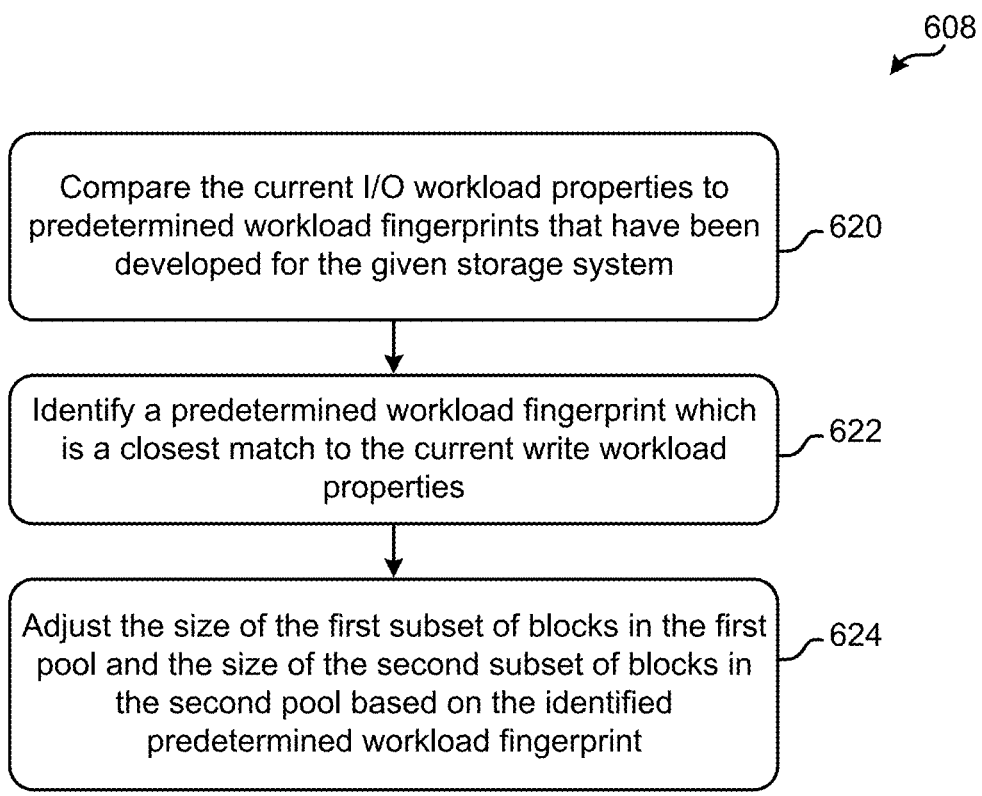
FIG. 6B is a flowchart of sub-processes for one of the operations in the method of FIG. 6A, in accordance with one embodiment.

With continued reference to sub-operation 620 of FIG. 6B, some of the approaches included herein are able to develop fingerprints which correspond to different types of I/O workloads that may actually be experienced by the memory during runtime. In other words, each of the workload fingerprints are developed to classify (e.g., identify) a specific I/O workload. Moreover, these fingerprints are preferably developed offline (e.g., see FIG. 6C below) through testing, simulation, modelling, etc., in order to conserve system resources during runtime and preloaded as part of the firmware of the hybrid storage controller, but may be developed at any point depending on the desired approach. With respect to the present description, it should be noted that "developed offline" indicates that the fingerprints are developed (e.g., computed) such that computational resources are not consumed during nominal operation in order to compute the operating settings which achieve desirable performance. In some approaches the fingerprints are developed by a system which is removed from a memory and hybrid controller implementing the various processes herein. In other approaches, the I/O workload is sampled and processed by the hybrid controller during idle times to create new workload fingerprints and identify the associated operating settings (e.g., optimal controller parameter settings). The specific I/O workloads associated with a given fingerprint may also be used to determine settings for the first and/or second block pools which are predicted to achieve desirable performance when implemented during the respective types of I/O workloads.

According to an illustrative approach, which is in no way intended to limit the invention, write amplification as a function of over-provisioning may be used as a metric to predefine a given workload fingerprint. In other words, a percentage of the storage capacity for a given block pool that is occupied by valid user data may be used to predefine a given workload fingerprint. For example, a lower write amplification experienced for a given over-provisioning may imply a higher write skew. According to another illustrative approach, which is again in no way intended to limit the invention, an SLC invalidation rate and a QLC invalidation rate may be used as a metric to predefine a given workload fingerprint. In other words, the percentage of user writes which overwrite data stored in either the single-bit or multi-bit pool of blocks and/or what percentage of the total data is stored in those blocks. For example, a higher SLC invalidation rate may imply a higher write skew, a lower SLC invalidation rate might imply lower skew, while a SLC or QLC invalidation rate of zero might imply no write skew.

By applying the types of I/O workloads that are associated with one of the predetermined fingerprints to memory, the settings for the block pools which achieve desirable performance when implemented during the respective types of I/O workloads may be determined based on testing, simulation, and/or modeling. In other words, the I/O workloads which correspond to a predetermined fingerprint may be applied by a controller (e.g., a hybrid controller, a storage controller, a Flash core module, etc.) to a given storage environment having first and second block pools as described above (e.g., see FIG. 5).

While the I/O workloads are applied to the first and/or second block pools, various adjustments may be made to the settings of the block pools, e.g., such as the size, occupancy, etc., of the respective block pools. Performance of the memory experienced as a result of each of the adjustments that are made to the settings is preferably stored and compared such that the size, occupancy, etc., of each of the block pools which achieved the most desirable performance is identified for the given I/O workloads. The settings, e.g., size, pool occupancy (the ratio of storage capacity to user data in a block pool), etc., of each of the block pools which achieved the most desirable performance for the given I/O workload and device utilization (user data size) may further be compiled into a workload configuration template which is correlated with the predetermined fingerprint. Each of the workload configuration templates includes the specific combination of I/O workload characteristics which were applied during the testing and/or modeling and the block pool settings which achieved desirable performance. The predetermined fingerprints may thereby be used to identify specific operating conditions experienced by the memory based on current workload I/O metrics, and provide block pool settings which are predetermined to achieve desirable performance.

It follows that various ones of the approaches herein are able to correlate predetermined settings for the first and/or second block pools which are predicted to achieve desirable performance when implemented during certain types of I/O workloads. Thus, the size and/or occupancy of the different block pools may be adapted based on a set of precomputed workload configuration templates that are developed offline for each of the predetermined workload fingerprints, thereby conserving computing resources while also achieving desirable performance and/or endurance. According to some approaches, each of the templates includes specific settings for each of the first and second pools, e.g., such as the respective sizes for different device utilizations, that can be easily examined and implemented to achieve optimal performance of the block pools.

Referring still to FIG. 6B, sub-operation 622 includes identifying a predetermined workload fingerprint which is a closest match to the current workload I/O metrics. With respect to the present description, it should be noted that the "closest match" is in no way intended to be limiting. For instance, in some approaches, the closest match may simply be identified as the predetermined workload fingerprint which most closely resembles the actual I/O metrics that are experienced. For example, the predetermined fingerprint which includes a write rate that most closely matches the experienced write rate. In other approaches, the closest match may be identified as the predetermined workload fingerprint which matches the actual I/O properties that are experienced within a predetermined tolerance. It follows that the "closest match" is preferably determined based on characteristics which are associated with the predetermined workload fingerprint, e.g., as would be appreciated by one skilled in the art after reading the present description.

From sub-operation 622, the flowchart proceeds to sub-operation 624 which includes adjusting the size of the first subset of blocks in the first pool and the size of the second subset of blocks in the second pool based on a workload configuration template that is associated with the identified predetermined workload fingerprint. In other words, the operational settings for the first and/or second block pools which are specified in the workload configuration template (which is associated with the predetermined workload fingerprint identified in sub-operation 622) are implemented.

Depending on the settings that are associated with the predetermined workload fingerprint, the size and/or occupancy of the first and second pools may be adjusted differently. For instance, in some situations the settings may specify that the size and/or occupancy of the first block pool be decreased while the size of the second block pool be increased. In such situations, sub-operation 624 may include transferring at least one block from the first subset of blocks in the first pool to the second subset of blocks in the second pool.

According to some approaches, the process of transferring the at least one block from the first subset of blocks in the first pool to the second subset of blocks in the second pool involves performing a series of steps which ensure that data retention is maintained. For example, one of the initial steps involves identifying and relocating any valid data that is stored in the at least one block being transferred. Valid data in the at least one block may be identified by examining a lookup table, inspecting the at least one block, checking flags associated with each page in the block, etc. Moreover, the at least one block is preferably erased, e.g., as a result of performing a garbage collection process on the at least one block. Once erased, the at least one block is preferably reconfigured from SLC mode to multi-bit-per-cell mode. The at least one block is then preferably transferred to a second ready-to-use (RTU) queue which corresponds to the second pool, e.g., such that the at least one block is available for use in the second pool, thereby effectively decreasing the size of the first pool while also increasing the size of the second pool.

However, in other situations the settings associated with the identified predetermined workload fingerprint may specify that the size of the second block pool be decreased while the size of the first block pool be increased. In such situations, sub-operation 624 may include transferring at least one block from the second subset of blocks in the second pool to the first subset of blocks in the first pool. As mentioned above, this process of transferring the at least one block between the second and first pools may further involve performing a series of steps. According to preferred approaches, the series of steps includes relocating valid data from the at least one block, erasing the at least one block, reconfiguring the at least one block from multi-bit-per-cell mode to SLC mode, and transferring the at least one block to a first RTU queue which corresponds to the first pool.

It follows that various ones of the approaches included herein are able to correlate predetermined settings for the first and/or second block pools which are predicted to achieve desirable performance when implemented during prespecified I/O workloads. This is achieved in some of the approaches by updating the metrics that constitute the various predetermined workload fingerprints, e.g., based on the testing and/or modeling that is performed offline for the given system. These updates may be performed at runtime by any desired hardware and/or firmware. The updated predetermined workload fingerprints are thereafter compared against performance information that is actually experienced during runtime, e.g., such that a predetermined workload fingerprint which is a closest match to the experienced performance may be identified. Once identified, the characteristics associated with the predetermined fingerprint are used to adjust the size of the first and second block pools such that the memory is able to perform efficiently for the given situation.

Figure 6C:
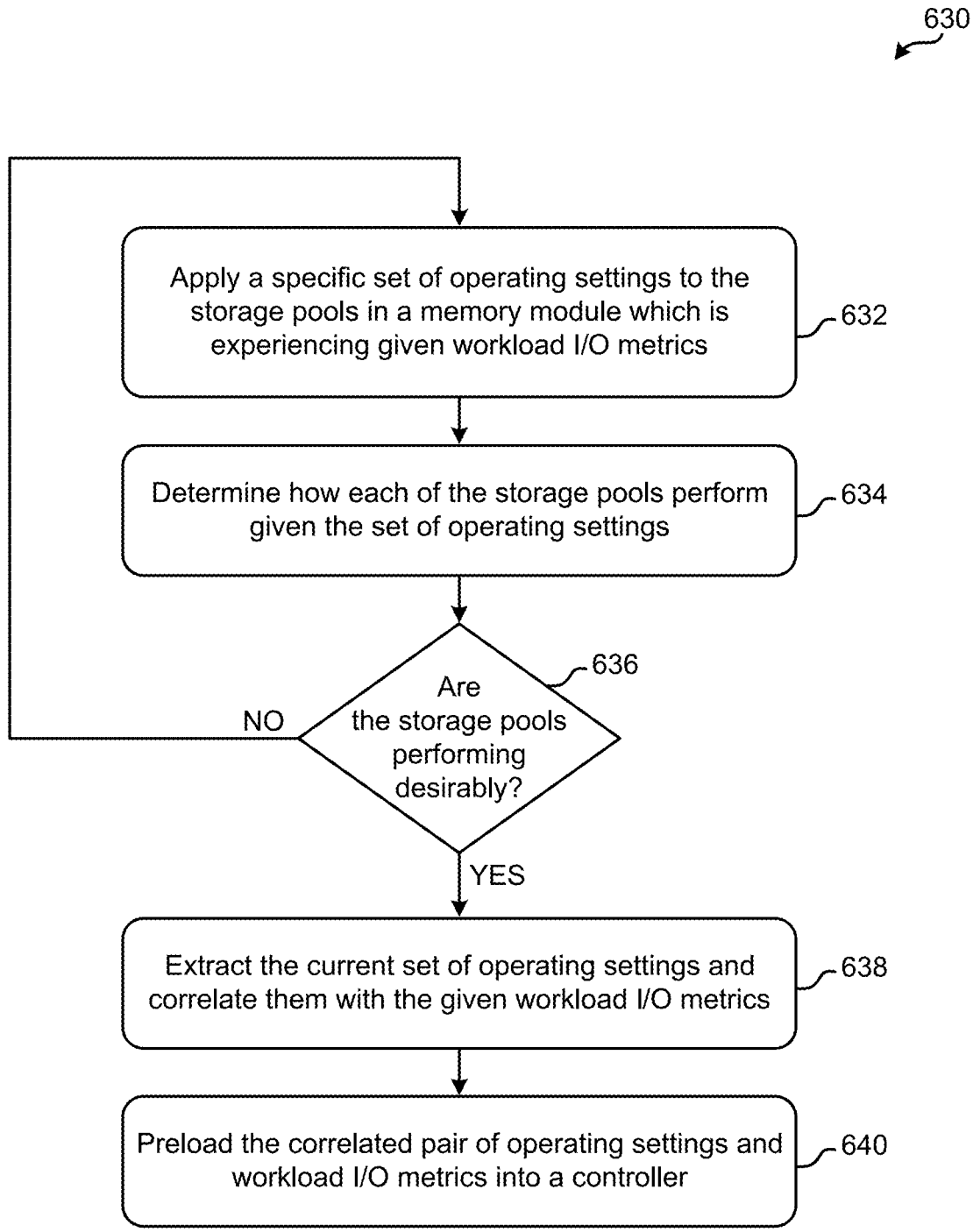
FIG. 6C is a flowchart of a method, in accordance with one embodiment.

Referring now to FIG. 6C, a method 630 for predetermining workload fingerprints offline is shown according to one embodiment. The method 630 may be performed in accordance with the present invention in any of the environments depicted in FIGS. 1-6B, among others, in various embodiments. Of course, more or less operations than those specifically described in FIG. 6C may be included in method 630, as would be understood by one of skill in the art upon reading the present descriptions.

Each of the steps of the method 630 may be performed by any suitable component of the operating environment. For example, in various embodiments, the method 630 may be partially or entirely performed by a hybrid controller, a controller, a processor, a computer, etc., or some other device having one or more processors therein. Thus, in some embodiments, method 630 may be a computer-implemented method. In such embodiments, the computer used to implement the method may include a memory module itself or a portion thereof, e.g., such as the hybrid controller. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 630. Illustrative processors include, but are not limited to, a central processing unit (CPU), an application specific integrated circuit (ASIC), a field programmable gate array (FPGA), etc., combinations thereof, or any other suitable computing device known in the art.

As noted above, method 630 may be used to predetermine workload fingerprints offline in accordance with one embodiment. Accordingly, operation 632 of method 630 includes applying a specific set of operating settings to the storage pools in a memory module which is experiencing given workload I/O metrics. In response to applying the specific set of operating settings, operation 634 includes determining how each of the storage pools perform given the set of operating settings which have been applied thereto. Performance of the storage pools may be determined using any desired metrics and/or analysis. For instance, storage pool performance may be determined in some approaches using a number of write amplifications, a destage frequency, an invalidation rate, etc. which is experienced.

Proceeding to decision 636, a determination is made as to whether the storage pools are performing desirably given the specific set of operating settings that have been applied thereto. With respect to the present description, it should be noted that "performing desirably" may vary depending on the approach. For instance, in some approaches decision 636 may determine whether each of the storage pools is experiencing performance characteristics which are greater than one or more respective thresholds that are predetermined by a user, industry standards, manufacturing specifications, etc. In other embodiments, decision 636 may determine whether method 630 has experienced a predetermined number of iterations, whereby the set of operating settings which correspond to a best performance of the storage pools over the number of iterations are extracted in operation 638, e.g., as will be described in further detail below.

In response to determining that the storage pools are not performing desirably (e.g., optimally), method 630 returns to operation 632 such that a different specific set of operating settings are applied to the storage pools before proceeding again to operation 634. It follows that processes 632, 634, and 636 may be repeated in an iterative fashion until it is determined that the storage pools are performing desirably (e.g., optimally).

Returning to decision 636, method proceeds to operation 638 in response to determining that the storage pools are performing desirably, where the current set of operating settings which correspond to the desirable performance are extracted and correlated with the given workload I/O metrics which the memory module experienced during the testing. In other words, operation 638 includes correlating the specific set of operating settings with a fingerprint that represents the experienced workload I/O metrics. Further still, operation 640 includes preloading the correlated pair of operating settings and workload I/O metrics (e.g., fingerprint) into a controller. In one approach, this pair may be preloaded into the controller by implementing the pair in the firmware used by a hybrid controller. However, the correlated pair may be preloaded into the controller using any other processes which would be apparent to one skilled in the art after reading the present description. By preloading the correlated pair in addition to a plurality of other correlated pairs predetermined offline using method 630, computational resources are not consumed during nominal operation in order to compute the operating settings which achieve desirable performance. The controller is thereby able to conserve system resources during runtime and improve performance overall.

Figure 7:
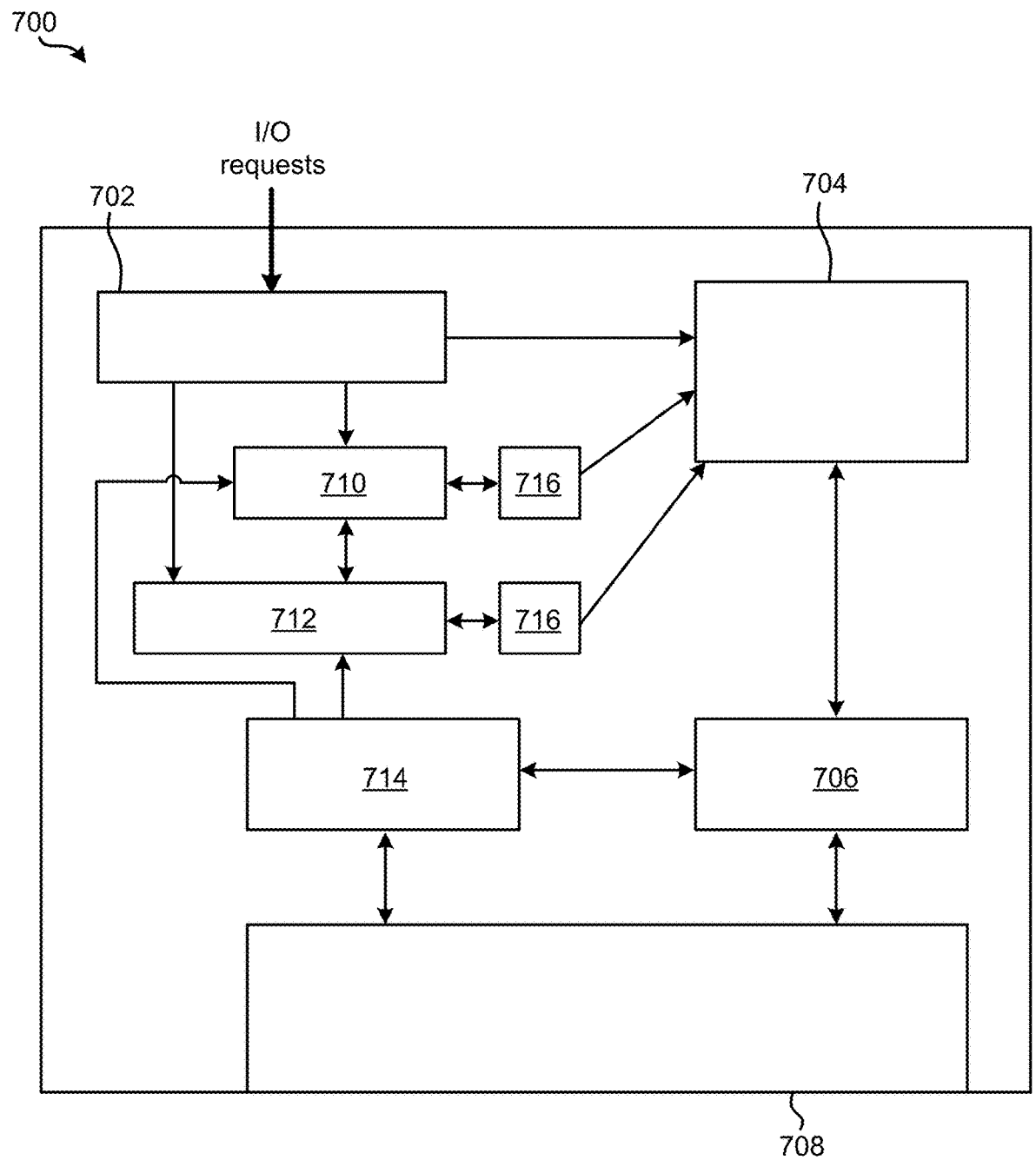
FIG. 7 is a partial representational view of a Flash core module, in accordance with one embodiment.

Looking to FIG. 7, a Flash core module 700 is illustrated in accordance with one embodiment, which is in no way intended to limit the invention. As an option, the present Flash core module 700 may be implemented in conjunction with features from any other embodiment listed herein, such as those described with reference to the other FIGS., such as FIGS. 6A-6C. However, such Flash core module 700 and others presented herein may be used in various applications and/or in permutations which may or may not be specifically described in the illustrative embodiments listed herein. Further, the Flash core module 700 presented herein may be used in any desired environment. Thus FIG. 7 (and the other FIGS.) may be deemed to include any possible permutation.

As shown, an I/O handling module 702 in the Flash core module 700 receives I/O requests, e.g., from a user. The I/O handling module 702 is coupled to a fingerprint module 704 which maintains performance characteristics which correspond to various existing fingerprints. In some approaches, the fingerprint module 704 may also collect I/O requests which pertain to desired performance characteristics. The fingerprint module 704 is also coupled to a workload identification module 706 which is preferably able to use the received I/O requests to identify a workload which most closely matches the current performance of the system. In other words, the workload identification module 706 is able to identify a predetermined workload fingerprint which most closely matches the I/O requests which are currently being experienced.

The workload identification module 706 is further coupled to the workload configuration template bank 708 which preferably stores the correlations between the predetermined workload fingerprints and the corresponding block pool settings identified in various workload configuration templates. As described above, settings for the first and second block pools which achieve the most desirable performance are preferably determined for each of the predetermined workload fingerprints and implemented in respective workload configuration templates. This allows for the settings of the first and second pools to be adjusted in real time based on the I/O requests that are received such that efficient performance is maintained. Moreover, these pool settings are preferably determined while the system is "offline" rather than in real time such that computational resources are conserved.

The workload configuration template bank 708 is thereby able to identify the settings for the first and second block pools 710, 712 respectively. These settings are thereby sent to the pool management module 714 which uses the settings to actually adjust the size and/or occupancy of the first and second block pools 710, 712, e.g., according to any of the approaches included herein. It should also be noted that the pool management module 714 receives workload type information from the workload identification module 706 in some approaches.

Garbage collection modules 716 are used to erase blocks in each of the block pools 710, 712 during normal operation as well as during the process of adjusting the size and/or occupancy of the first and second block pools 710, 712. The garbage collection modules 716 may receive instructions from the pool management module 714 and also preferably provide performance-based information to the fingerprint module 704, e.g., for further analysis.

It follows that the Flash core module 700 is able to maintain the statistics that are used to develop the predetermined workload fingerprints, e.g., to develop additional fingerprints. The statistics used by any of the components in FIG. 7 may be updated at any desired interval, e.g., such as after each page write. in a lazy manner (e.g., in the background), in a statistical manner (e.g., every "N" writes where "N" may be large) to reduce overhead, etc. Moreover, the pool management module 714 and/or the workload identification module 706 may also operate at any desired frequencies, e.g., depending on the approach. For instance, in some approaches the pool management module 714 may operate at a more frequent clock rate than the workload identification module 706, e.g., in response to changes in device utilization. Furthermore, the workload configuration template bank 708 may only operate when the workload experiences a sufficient change.

Referring now to an in-use example which is in no way intended to limit the invention, predetermined fingerprints may be formed based on write amplification that is experienced during testing of a given memory. In this example, an initial assumption is made that a default workload is exercised and the pool sizes are set based on the default values in the workload configuration template, as well as the current utilization. The average space utilization (e.g., the fraction of a pool that is occupied by used data) is further monitored for a representative window of time and/or number of accesses. For example, a given window may correspond to 15 minutes, write operations being performed to 10% of the device capacity, 10% of all blocks experience a garbage collection procedure, etc. The average fraction of page relocations in each of the pools are also monitored while various blocks are cleaned over the same window of time and/or number of accesses.

Space utilization and page relocations are further used to look up a best matching workload in a precomputed relocation table, and the workload type is used to retrieve the desired size and/or utilization for the given block pool. It should also be noted that the number of page relocations for a given workload may depend on the controller design and/or garbage collection implementation. For example, a controller design that uses a tiered architecture experiences a different number of page relocations compared to a controller that uses a cache architecture. Moreover, in situations where the statistics identify multiple different workloads, the workload which is identified based on the statistics of the tier with more data can be assigned a weighted value (e.g., preference), more than one of the workloads may be merged (e.g., averaged), the workloads with a lower over-provisioning may be given precedence, etc. In some approaches equivalent metrics which reflect the ratio of user data to physical capacity may be implemented, e.g., such as device utilization, logical and/or physical over-provisioning, etc.

Referring now to another in-use example which is in no way intended to limit the invention, predetermined fingerprints may be formed based on hit rates that are experienced during testing of a given memory. In this example, an initial assumption is made to start a default workload and set the size and/or occupancy of the pools based on the workload configuration template. The average hit rate per user page is monitored, and a predefined table is used to look up the expected hit rate for the current workload. A workload that matches the measured hit rate is thereafter identified. However, it should be noted that if the hit rate is higher than expected, a more skewed workload may be assumed, while situations in which a lower than expected hit rate is experienced allow for an assumption of a less skewed workload.

The size and/or occupancy of the pools are thereafter adjusted according to the newly detected workload, preferably using a predefined template. Moreover, this process is preferably repeated, e.g., periodically, when the hit rate deviates from an expected value, etc. Implementations which evaluate hit rates are primarily applicable in situations where most incoming I/O requests are performed by the SLC memory tier. Examples of such a controller architecture include situations where a controller uses the SLC tier as a cache and/or a controller with a SLC cache, or a bypass valve. It is also preferred that the SLC hit rate is not updated while writing new data.

Further still, a hit rate table can be compressed in number of different ways. For instance, the range can be discretized with varying precision, the number of significant digits can be reduced, compression methods (e.g., run length encoding, delta compression, etc.), implicit values can be omitted, etc.

Information gathered using either of the foregoing in-use examples may further be compiled and utilized offline to determine preferred settings for static controller parameters. Examples of static parameters include, but are in no way limited to, the controller architecture, the garbage collection algorithms, properties of the Flash chips, etc. This information may further be graphed. The curves of the graphs can be discretized and transformed into lookup tables which are indexed by device utilization and/or an equivalent metric that captures the amount of data that is stored. Other metrics equivalents to over-provisioning include, but again are in no way limited to an amount of user data, extra space available, device utilization, etc.

Any of the approaches included herein may experience a situation where the current controller metrics do not match a predetermined fingerprint (e.g., within an acceptable margin of error). This could happen, for example, in case of a workload that is not known in advance. This situation may be resolved in some approaches by selecting a workload which has a corresponding fingerprint which is determined to be "closest" to the current controller metrics. There may be room for improvement for the parameter configuration, however, it would still represent the most desirable controller configuration for the given situation, and would thereby be an improvement over setting the parameter values in a workload-agnostic manner. A distance metric may also be introduced to quantify the similarity between the current metrics and the pre-defined metrics of the workload fingerprints. Such a metric might give different weights to the workload metrics which may be varied dynamically based on the operating point of the controller. However, in other approaches this situation may be resolved by using a parameter configuration that is between the configurations for the closest matching workloads. For instance, the neighboring workload fingerprints may be identified. Moreover, a new configuration may be computed by interpolating between the parameters of the configurations of the neighboring workload fingerprints.

In other instances, new user workloads may be received which do not correspond to any predetermined workload fingerprints. In these situations, the software and/or firmware may be updated with a new set of workload fingerprints and/or configuration templates. The knowledge about which new workloads should be supported or which existing workloads should be refined can be obtained by gathering workload statistics at runtime on the user premises in some approaches.

The parameters described in a configuration template are further designed to improve a fixed objective, e.g., performance and/or endurance. Thus, it may be beneficial to vary the objectives over time and/or based on user input. For example, a controller may initially attempt to improve performance, while Flash endurance may be improved towards the end of the expected lifespan of the memory. Moreover, between these two stages, the controller may implement tradeoffs between improving performance and endurance, e.g., as desired. In such situations, two or more configuration templates may be implemented rather than a single template for each known workload. One of these templates may be used to improve performance, while the other is used to improve endurance. Additional templates may also be added in response to other optimization objectives which may be identified. It follows that the controller may be able to select the appropriate template based on the age of the device, based on user preferences, etc.

It should also be noted that a hybrid controller as described herein may have multiple operating modes. For example, in situations involving low space utilization (e.g., a device is less than 20% full), a majority of the blocks may be converted into SLC mode. However, in situations where high space utilization is experienced (e.g., device is full with user data), most of the blocks are preferably configured in multi-bit-per-cell mode. It follows that the relative weight of the various statistics that are used to form a predetermined workload fingerprint should also change between these two extremes. In some approaches this may be achieved by dynamically varying the weights that are assigned to the statistics which compose a predetermined workload fingerprint based on the controller state.

It follows that various ones of the approaches included herein are able to adapt to different workloads dynamically in order to achieve higher performance and/or device endurance. This is achieved, at least in part, by evaluating a full (e.g., complete) set of dynamic workload metrics. Moreover, the statistics that correspond to the predetermined workload fingerprints can be periodically sent to the memory manufacturer which allows for further characterization of the type of workload(s) the user experiences. Having a more complete understanding of the common types of workloads allows further improvements to performance and user support which is greatly desired.

It should be noted that although various ones of the approaches have been described herein in the context of two memory block pools, any of these approaches may be extended to embodiments having more than two block pools. In such embodiments, the predetermined workload fingerprints may be based on more than two different block pools. It should also be noted that terms including "in a range" and "above a threshold" are in no way intended to limit the invention. Rather than determining whether a value is in a given range or above a given threshold, equivalent determinations may be made, e.g., as to whether a value is outside a predetermined range, whether an absolute value is above a threshold, whether a value is below a threshold, etc., depending on the desired approach.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Figure 8:
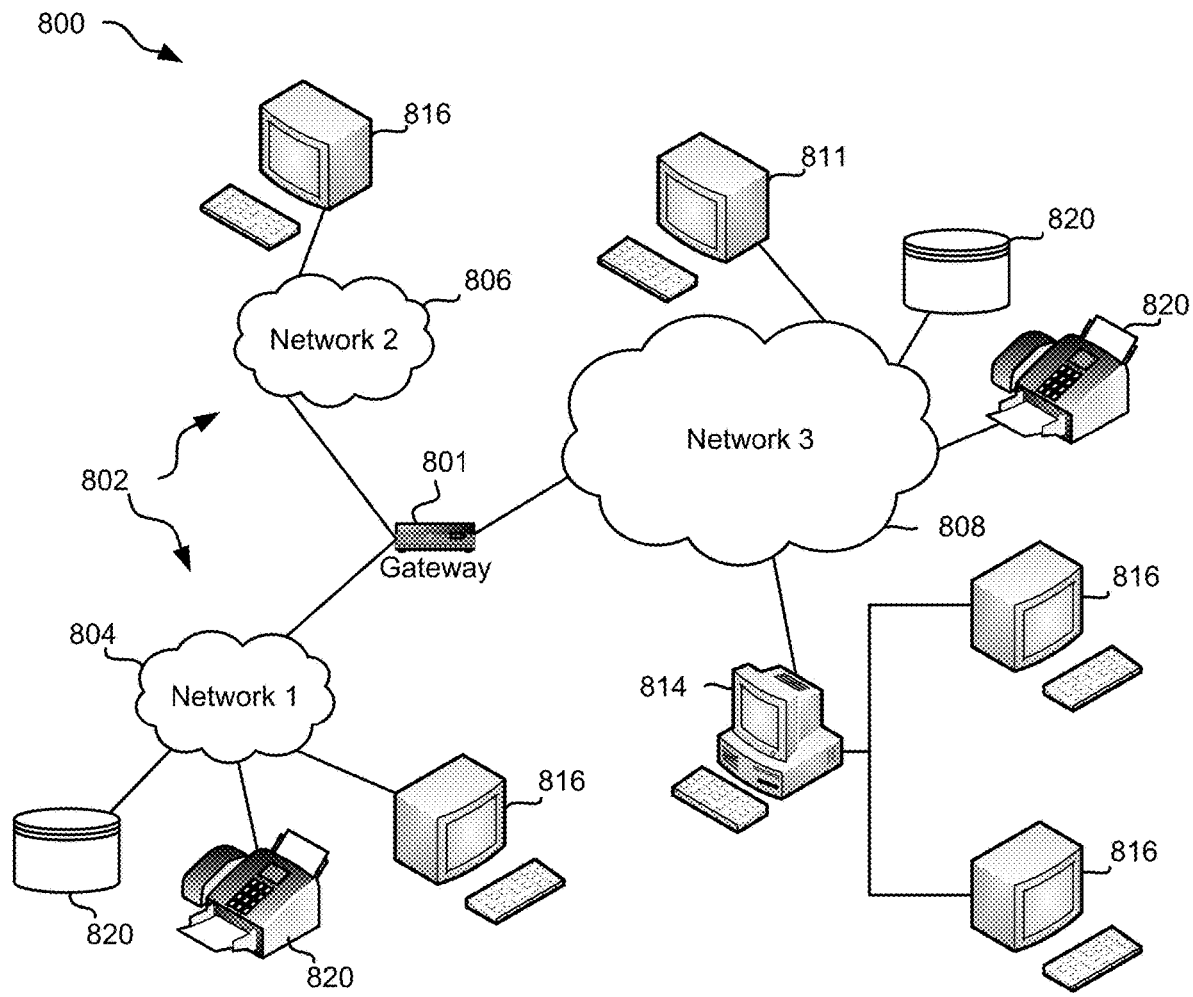
FIG. 8 is a network architecture, in accordance with one embodiment.

FIG. 8 illustrates a network architecture 800, in accordance with one embodiment. As shown in FIG. 8, a plurality of remote networks 802 are provided including a first remote network 804 and a second remote network 806. A gateway 801 may be coupled between the remote networks 802 and a proximate network 808. In the context of the present network architecture 800, the networks 804, 806 may each take any form including, but not limited to a LAN, a WAN such as the Internet, public switched telephone network (PSTN), internal telephone network, etc.

In use, the gateway 801 serves as an entrance point from the remote networks 802 to the proximate network 808. As such, the gateway 801 may function as a router, which is capable of directing a given packet of data that arrives at the gateway 801, and a switch, which furnishes the actual path in and out of the gateway 801 for a given packet.

Further included is at least one data server 814 coupled to the proximate network 808, and which is accessible from the remote networks 802 via the gateway 801. It should be noted that the data server(s) 814 may include any type of computing device/groupware. Coupled to each data server 814 is a plurality of user devices 816. Such user devices 816 may include a desktop computer, laptop computer, handheld computer, printer, and/or any other type of logic-containing device. It should be noted that a user device 811 may also be directly coupled to any of the networks, in some embodiments.

A peripheral 820 or series of peripherals 820, e.g., facsimile machines, printers, scanners, hard disk drives, networked and/or local data storage units or systems, etc., may be coupled to one or more of the networks 804, 806, 808. It should be noted that databases and/or additional components may be utilized with, or integrated into, any type of network element coupled to the networks 804, 806, 808. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 804, 806, 808, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 9:
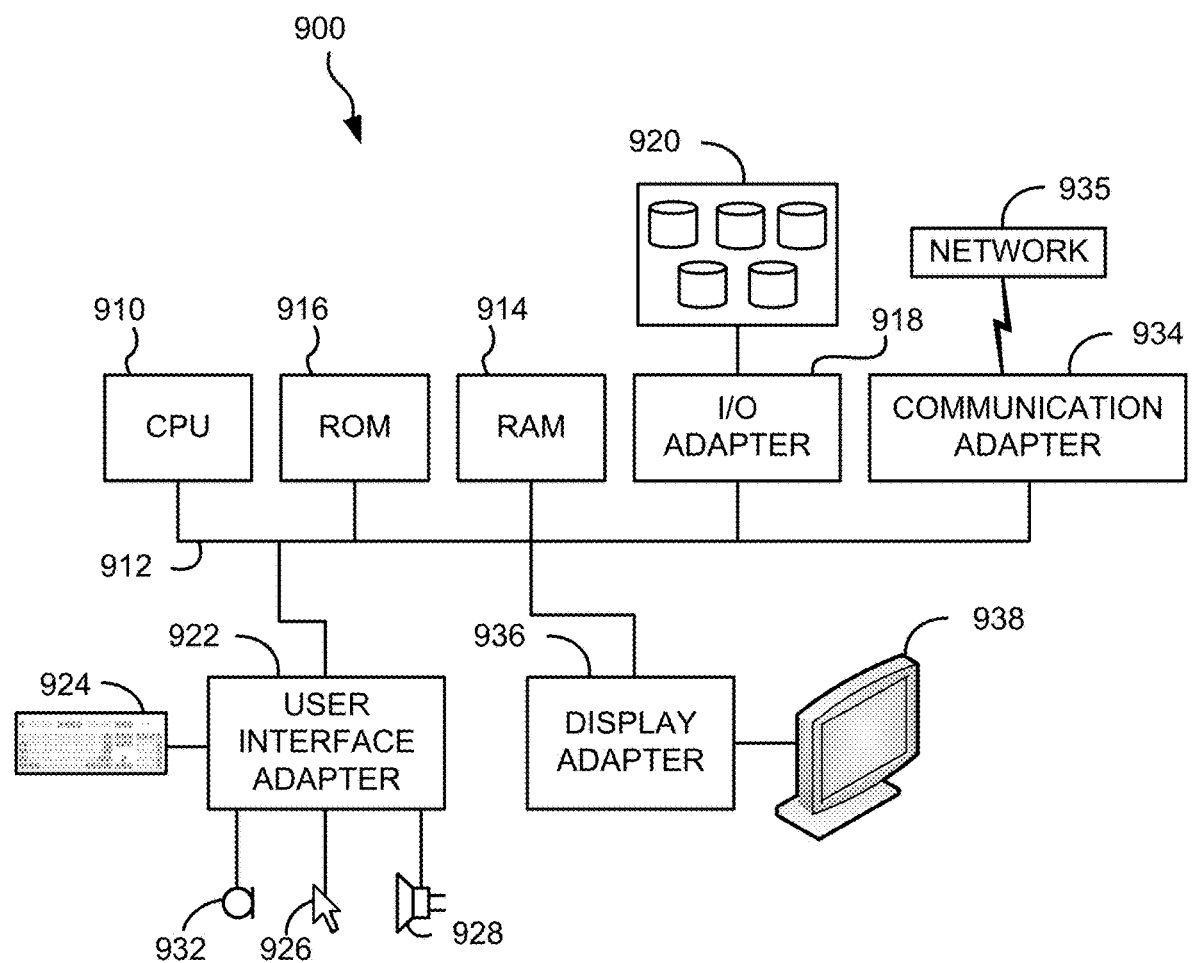
FIG. 9 is a representative hardware environment that may be associated with the servers and/or clients of FIG. 8, in accordance with one embodiment.

FIG. 9 shows a representative hardware environment associated with a user device 816 and/or server 814 of FIG. 8, in accordance with one embodiment. FIG. 9 illustrates a typical hardware configuration of a processor system 900 having a central processing unit 910, such as a microprocessor, and a number of other units interconnected via a system bus 912, according to one embodiment. In some embodiments, central processing unit 910 may include any of the approaches described above with reference to the one or more processors 210 of FIG. 2.

The processor system 900 shown in FIG. 9 includes a Random Access Memory (RAM) 914, Read Only Memory (ROM) 916, and an I/O adapter 918. According to some embodiments, which are in no way intended to limit the invention, I/O adapter 918 may include any of the approaches described above with reference to I/O adapter 218 of FIG. 2. Referring still to processor system 900 of FIG. 9, the aforementioned components 914, 916, 918 may be used for connecting peripheral devices such as storage subsystem 920 to the bus 912. In some embodiments, storage subsystem 920 may include a similar and/or the same configuration as data storage system 220 of FIG. 2. According to an example, which is in no way intended to limit the invention, storage subsystem 920 may include non-volatile data storage cards, e.g., having NVRAM memory cards, RAM, ROM, and/or some other known type of non-volatile memory, in addition to RAID controllers as illustrated in FIG. 2.

With continued reference to FIG. 9, a user interface adapter 922 for connecting a keyboard 924, a mouse 926, a speaker 928, a microphone 932, and/or other user interface devices such as a touch screen, a digital camera (not shown), etc., to the bus 912.

Processor system 900 further includes a communication adapter 934 which connects the processor system 900 to a communication network 935 (e.g., a data processing network) and a display adapter 936 which connects the bus 912 to a display device 938.

The processor system 900 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 10:
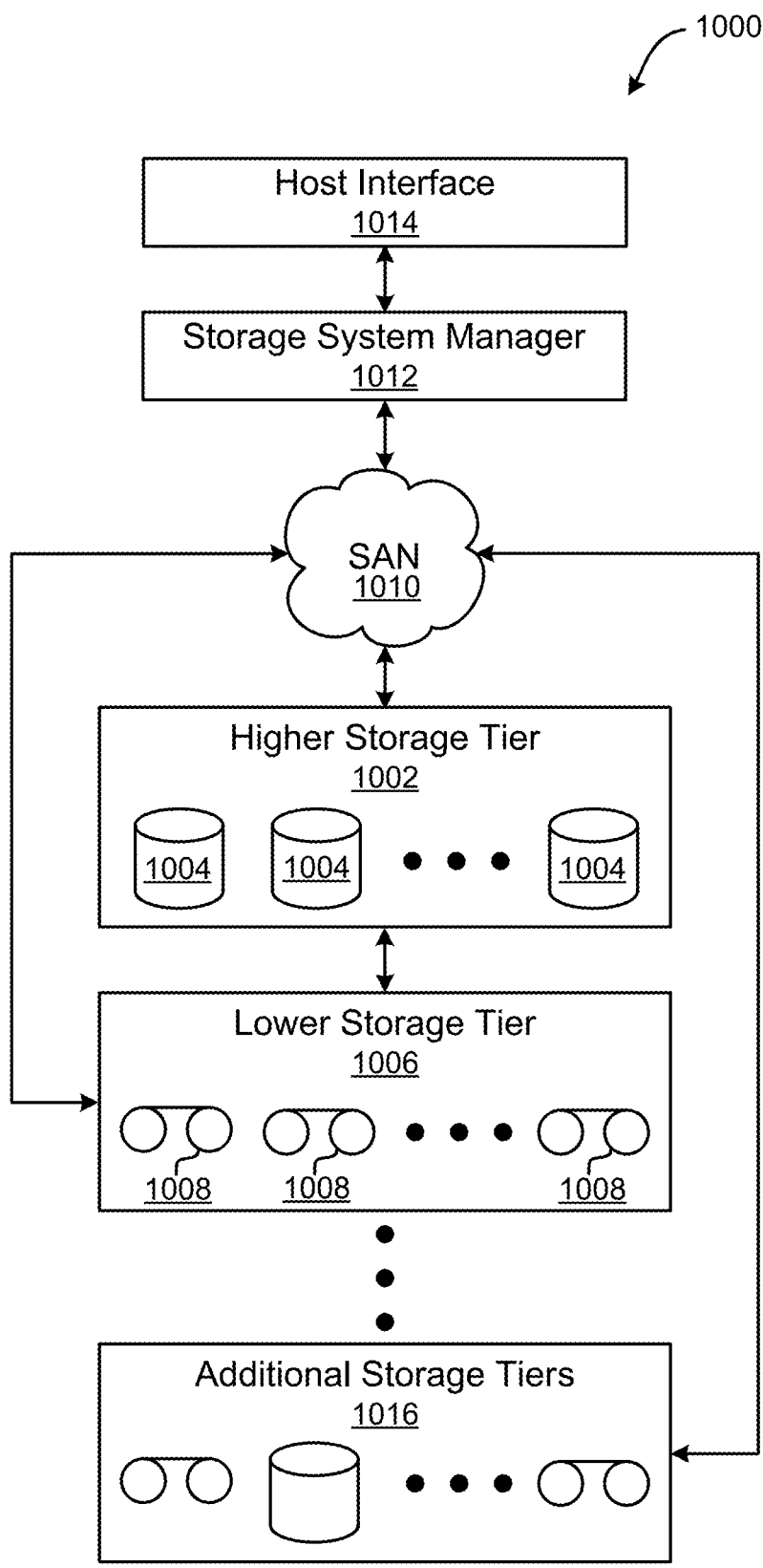
FIG. 10 is a tiered data storage system in accordance with one embodiment.

Moreover, FIG. 10 illustrates a storage system 1000 which implements high level (e.g., SSD) storage tiers in combination with lower level (e.g., magnetic tape) storage tiers, according to one embodiment. Note that some of the elements shown in FIG. 10 may be implemented as hardware and/or software, according to various embodiments. The storage system 1000 may include a storage system manager 1012 for communicating with a plurality of media on at least one higher storage tier 1002 and at least one lower storage tier 1006. However, in other approaches, a storage system manager 1012 may communicate with a plurality of media on at least one higher storage tier 1002, but no lower storage tier. The higher storage tier(s) 1002 preferably may include one or more random access and/or direct access media 1004, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 1002 depending on the desired embodiment.

Referring still to FIG. 10, the lower storage tier(s) 1006 preferably includes one or more lower performing storage media 1008, including sequential access media such as magnetic tape in tape drives and/or optical media, slower accessing HDDs, slower accessing SSDs, etc., and/or others noted herein or known in the art. One or more additional storage tiers 1016 may include any combination of storage memory media as desired by a designer of the system 1000. Thus, the one or more additional storage tiers 1016 may, in some approaches, include a SSD system architecture similar or the same as those illustrated in FIGS. 1-2. Also, any of the higher storage tiers 1002 and/or the lower storage tiers 1006 may include any combination of storage devices and/or storage media.

The storage system manager 1012 may communicate with the storage media 1004, 1008 on the higher storage tier(s) 1002 and lower storage tier(s) 1006 through a network 1010, such as a storage area network (SAN), as shown in FIG. 10, or some other suitable network type. The storage system manager 1012 may also communicate with one or more host systems (not shown) through a host interface 1014, which may or may not be a part of the storage system manager 1012. The storage system manager 1012 and/or any other component of the storage system 1000 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 1000 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 1002, may include a majority of SSD storage media for storing data in a higher performing storage environment, and remaining storage tiers, including lower storage tier 1006 and additional storage tiers 1016 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 1002, while data not having one of these attributes may be stored to the additional storage tiers 1016, including lower storage tier 1006. Of course, one of skill in the art, upon reading the present descriptions, may devise many other combinations of storage media types to implement into different storage schemes, according to the embodiments presented herein.

According to some embodiments, the storage system (such as 1000) may include logic configured to receive a request to open a data set, logic configured to determine if the requested data set is stored to a lower storage tier 1006 of a tiered data storage system 1000 in multiple associated portions, logic configured to move each associated portion of the requested data set to a higher storage tier 1002 of the tiered data storage system 1000, and logic configured to assemble the requested data set on the higher storage tier 1002 of the tiered data storage system 1000 from the associated portions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing a plurality of blocks of memory in two or more pools, comprising:
    maintaining a first subset of the plurality of blocks in a first pool, wherein the blocks maintained in the first pool are configured in single-level cell (SLC) mode;
    maintaining a second subset of the plurality of blocks in a second pool, wherein the blocks maintained in the second pool are configured in multi-bit-per-cell mode;
    identifying current workload input/output (I/O) metrics during runtime; and
    adjusting a size of the first subset of blocks in the first pool and a size of the second subset of blocks in the second pool based on the current workload I/O metrics,
    wherein adjusting a size of the first subset of blocks in the first pool and a size of the second subset of blocks in the second pool based on the current workload I/O metrics includes:
        comparing the current workload I/O metrics to predetermined workload fingerprints.

2. The computer-implemented method of claim 1, wherein adjusting a size of the first subset of blocks in the first pool and a size of the second subset of blocks in the second pool based on the current workload I/O metrics includes:
    identifying a predetermined workload fingerprint which is a closest match to the current workload I/O metrics; and
    adjusting the size of the first subset of blocks in the first pool and the size of the second subset of blocks in the second pool based on a workload configuration template associated with the identified predetermined workload fingerprint.

3. The computer-implemented method of claim 2, wherein the workload I/O metrics include write skew.

4. The computer-implemented method of claim 2, wherein the workload configuration template includes specific settings for each of the first and second pools.

5. The computer-implemented method of claim 4, wherein the specific settings include the size and an occupancy of each of the respective first and second pools, wherein the size of the first subset of blocks in the first pool is adjusted using the specific settings for the first pool, wherein the size of the second subset of blocks in the second pool is adjusted using the specific settings for the second pool.

6. The computer-implemented method of claim 2, wherein the method is implemented by a hybrid controller, wherein the predetermined workload fingerprints are computed offline and preloaded into the hybrid controller.

7. The computer-implemented method of claim 6, wherein adjusting the size of the first subset of blocks in the first pool and the size of the second subset of blocks in the second pool includes:
    transferring at least one block from the second subset of blocks in the second pool to the first subset of blocks in the first pool and/or transferring at least one block from the first subset of blocks in the first pool to the second subset of blocks in the second pool.

8. The computer-implemented method of claim 1, wherein the memory includes non-volatile random access memory (NVRAM).

9. The computer-implemented method of claim 1, wherein the blocks in the second pool that are configured in multi-bit-per-cell mode are configured in a multi-bit-per-cell mode selected from the group consisting of: triple-level cell (TLC) mode, quad-level cell (QLC) mode, and penta-level cell (PLC) mode.

10. A computer program product for managing a plurality of blocks of memory in two or more pools, the computer program product comprising a computer readable storage medium having program instructions embodied therewith, the program instructions readable and/or executable by a processor to cause the processor to:

maintain, by the processor, a first subset of the plurality of blocks in a first pool, wherein the blocks maintained in the first pool are configured in single-level cell (SLC) mode;

maintain, by the processor, a second subset of the plurality of blocks in a second pool, wherein the blocks maintained in the second pool are configured in multi-bit-per-cell mode;

identify, by the processor, current workload input/output (I/O) metrics during runtime; and adjust, by the processor, a size of the first subset of blocks in the first pool and a size of the second subset of blocks in the second pool based on the current workload I/O metrics, wherein adjusting a size of the first subset of blocks in the first pool and a size of the second subset of blocks in the second pool based on the current workload I/O metrics includes:

comparing the current workload I/O metrics to predetermined workload fingerprints, and identifying a predetermined workload fingerprint which is a closest match to the current workload I/O metrics.

11. The computer program product of claim 10, wherein adjusting a size of the first subset of blocks in the first pool and a size of the second subset of blocks in the second pool based on the current workload I/O metrics includes:

adjusting the size of the first subset of blocks in the first pool and the size of the second subset of blocks in the second pool to match prespecified settings in a workload configuration template associated with the identified predetermined workload fingerprint.

12. The computer program product of claim 11, wherein the workload I/O metrics include write skew.

13. The computer program product of claim 11, wherein the workload configuration template includes the prespecified settings for each of the first and second pools.

14. The computer program product of claim 13, wherein the prespecified settings include the size and an occupancy of each of the respective first and second pools, wherein the size of the first subset of blocks in the first pool is adjusted using the prespecified settings for the first pool, wherein the size of the second subset of blocks in the second pool is adjusted using the prespecified settings for the second pool.

15. The computer program product of claim 11, wherein the processor is a hybrid controller, wherein the predetermined workload fingerprints are computed offline and preloaded into the hybrid controller.

16. The computer program product of claim 15, wherein adjusting the size of the first subset of blocks in the first pool and the size of the second subset of blocks in the second pool includes:

transferring at least one block from the second subset of blocks in the second pool to the first subset of blocks in the first pool and/or transferring at least one block from the first subset of blocks in the first pool to the second subset of blocks in the second pool.

17. The computer program product of claim 10, wherein the memory includes non-volatile random access memory (NVRAM).

18. The computer program product of claim 10, wherein the blocks in the second pool that are configured in multi-bit-per-cell mode are configured in a multi-bit-per-cell mode selected from the group consisting of: triple-level cell (TLC) mode, quad-level cell (QLC) mode, and penta-level cell (PLC) mode.

19. A system, comprising:

a plurality of non-volatile random access memory (NVRAM) blocks configured to store data; and a processor and logic integrated with and/or executable by the processor, the logic being configured to:

maintain, by the processor, a first subset of the plurality of blocks in a first pool, wherein the blocks maintained in the first pool are configured in single-level cell (SLC) mode;

maintain, by the processor, a second subset of the plurality of blocks in a second pool, wherein the blocks maintained in the second pool are configured in multi-bit-per-cell mode;

identify, by the processor, current workload input/output (I/O) metrics during runtime; and adjust, by the processor, a size of the first subset of blocks in the first pool and a size of the second subset of blocks in the second pool based on the current workload I/O metrics, wherein adjusting a size of the first subset of blocks in the first pool and a size of the second subset of blocks in the second pool based on the current workload I/O metrics includes:

comparing the current workload I/O metrics to predetermined workload fingerprints;

identifying a predetermined workload fingerprint which is a closest match to the current workload I/O metrics; and adjusting the size of the first subset of blocks in the first pool and the size of the second subset of blocks in the second pool based on a workload configuration template associated with the identified predetermined workload fingerprint.

\* \* \* \* \*